United States Patent [19]
Cummins

[11] Patent Number: 5,964,828
[45] Date of Patent: Oct. 12, 1999

[54] METHOD AND SYSTEM FOR MAINTAINING THE INTEGRITY OF OBJECTS

[75] Inventor: Fred Arthur Cummins, Farmington Hills, Mich.

[73] Assignee: Electronic Data System Corporation, Plano, Tex.

[21] Appl. No.: 09/016,529

[22] Filed: Jan. 30, 1998

Related U.S. Application Data

[60] Provisional application No. 60/065,400, Nov. 13, 1997, abandoned.

[51] Int. Cl.$^6$ ........................................................ G06F 9/00
[52] U.S. Cl. ............................................ 709/101; 709/303
[58] Field of Search .................................... 709/100, 101, 709/103, 104, 105, 107, 303; 707/203, 10, 101, 106, 45, 103, 48

[56] References Cited

U.S. PATENT DOCUMENTS

| | | | |
|---|---|---|---|
| 5,295,250 | 3/1994 | Komoto et al. ........................ | 708/209 |
| 5,418,888 | 5/1995 | Alden ...................................... | 706/48 |
| 5,428,782 | 6/1995 | White ...................................... | 709/101 |
| 5,615,362 | 3/1997 | Jensen et al. ........................... | 707/103 |
| 5,694,601 | 12/1997 | White ...................................... | 709/101 |
| 5,754,845 | 5/1998 | White ...................................... | 707/10 |
| 5,819,089 | 10/1998 | White ...................................... | 709/106 |

*Primary Examiner*—Majid A. Banankhah
*Attorney, Agent, or Firm*—L. Joy Griebenow; Baker & Botts L.L.P.

[57] ABSTRACT

The invention comprises a system and method for maintaining the integrity of a plurality of objects each comprising methods and instance variables. The method is used to maintain the integrity of a plurality of objects wherein each of the plurality of objects will experience a change in at least one of its instance variables in response to a transaction if the transaction is allowed to commit. The method comprises sending a validate message to ones of the plurality of objects using a transaction service running on a computer. A prepare message is sent to each of the plurality of objects if a valid indicator was received in response to each validate message. A commit message is sent to each of the plurality of objects if a valid indicator was received in response to each of the validate messages and a prepared indicator was received in response to each of the prepare messages.

20 Claims, 2 Drawing Sheets

METHOD AND SYSTEM FOR MAINTAINING THE INTEGRITY OF OBJECTS

RELATED APPLICATIONS

This application claims the benefit of U.S. provisional application Ser. No. 60/065,400, which was filed on Nov. 13, 1997 expired Jun. 12, 1999.

TECHNICAL FIELD OF THE INVENTION

This invention relates generally to object-oriented programming and more particularly to a method and system for maintaining the integrity of objects.

BACKGROUND OF THE INVENTION

Some computer applications are so large and the number of users of the applications so large that it makes sense to divide up the work of the application among multiple computers and, potentially, to store the information used by the application in many different places. Such applications are commonly referred to as distributed applications. Conventional distributed applications store shared information in multiple databases that may reside on many different computers.

Recently, however, software developers have begun to create distributed object systems. Distributed object systems comprise objects shared in computer memory and one or more processes running on one or more computers. In distributed object systems, then, an additional shared resource, the distributed object, needs to be accounted for.

Persistence of data is an important attribute in a distributed system. Data is preferably stored in a nonvolatile storage medium so that the system may be both recovered in the event of a failure and restarted in the state in which the system was shut down. A single transaction in a distributed system may update a number of items of data. If only some of the data items are persistently stored while others are not, then the state of the system may not be recoverable.

To maintain persistence in conventional distributed systems, a two phase commit protocol is generally used to synchronize the update of multiple databases. The two phase commit protocol assumes that the database management systems will perform necessary data integrity checks. This is reasonable when databases are the focus of control between multiple applications. However, in a shared, distributed object system, the shared objects become the focus of control and more sophisticated integrity checks may be desirable.

SUMMARY OF THE INVENTION

The invention comprises a method and system for maintaining the integrity of objects. The invention is particularly useful in distributed object systems. One aspect of the invention is a method for maintaining the integrity of a plurality of objects each comprising methods and instance variables wherein each of the plurality of objects will experience a change in at least one of its instance variables in response to a transaction if the transaction is allowed to commit. The method comprises sending a validate message to ones of the plurality of objects using a transaction service running on a computer. A prepare message is sent to each of the plurality of objects if a valid indicator was received in response to each validate message. A commit message is sent to each of the plurality of objects if a valid indicator was received in response to each of the validate messages and a prepared indicator was received in response to each of the prepare messages.

The invention has several important technical advantages. It allows an efficient way to ensure the integrity of data in shared objects and is particularly useful in distributed object systems. Validation methods can be created and tailored to the needs of each specific object. Because validation methods may be so tailored, these validation methods may include sophisticated business rules along with more general rules such as, for example, a zero value in the denominator of a fraction. Because distributed objects have access to other distributed objects, validation tests can be performed involving multiple distributed objects and/or data stored in multiple databases. Thus, the validation methods are more powerful than data integrity checks performed in conventional distributed systems.

The invention simplifies and makes possible sophisticated validation methods that may not be otherwise attainable. Because an object may pass through transitory invalid states before arriving at a valid new state, validity checks are advantageously performed at the end of a transaction, rather than during the steps leading up to the end of the transaction. Of course, some validation tests may occur during the transaction itself and such tests are not precluded by the invention.

The invention also may advantageously perform validation tests on all objects changed by a transaction and receive a response to the validation before proceeding with the preparation for a commit. Thus, if multiple points of invalidity are discovered, appropriate error messages for all points of invalidity may be delivered to the process initiating the transaction, thus allowing easier identification and solution of problems. In an alternative embodiment, only those objects requiring a validation test may register with a transaction service for validation. This feature of the invention may make the protocol more efficient.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
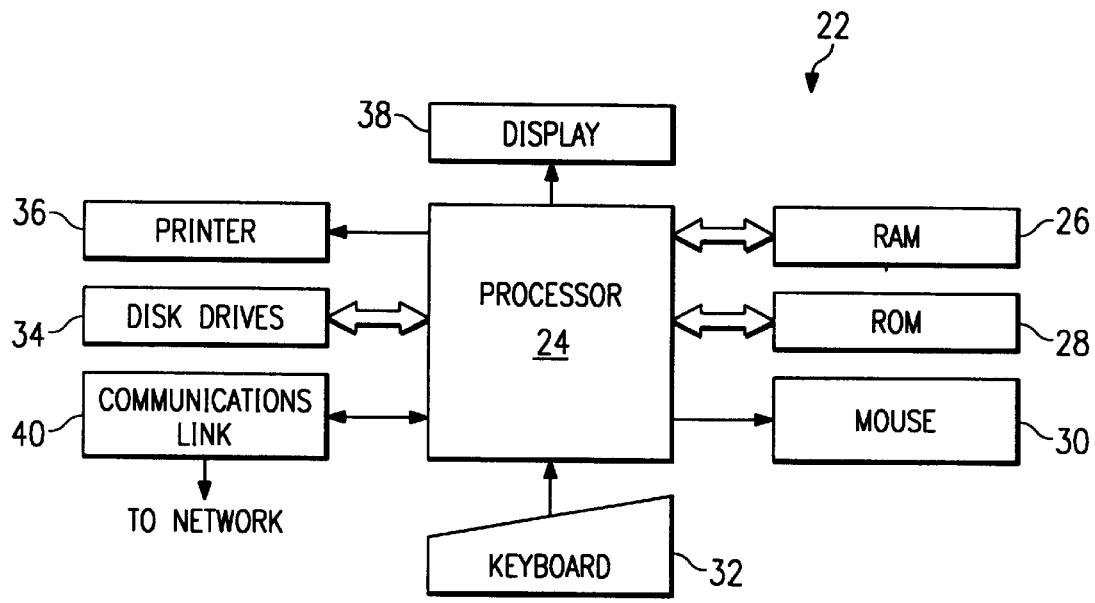
FIG. 1 illustrates an exemplary general purpose computer that may be used to implement the present invention.
Figure 2:
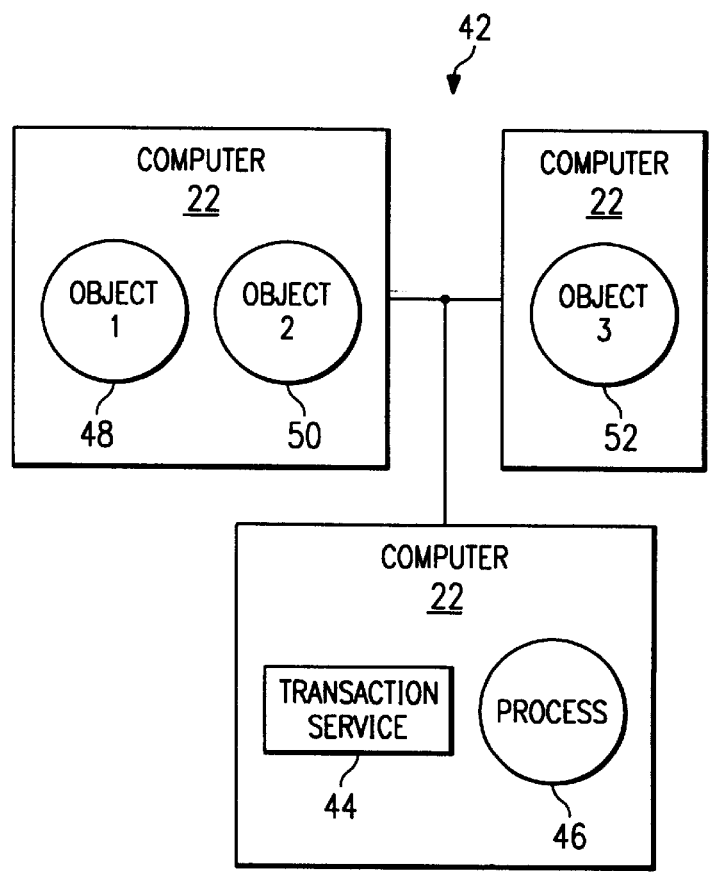
FIG. 2 illustrates an exemplary distributed object system constructed in accordance with the invention.
Figure 3:
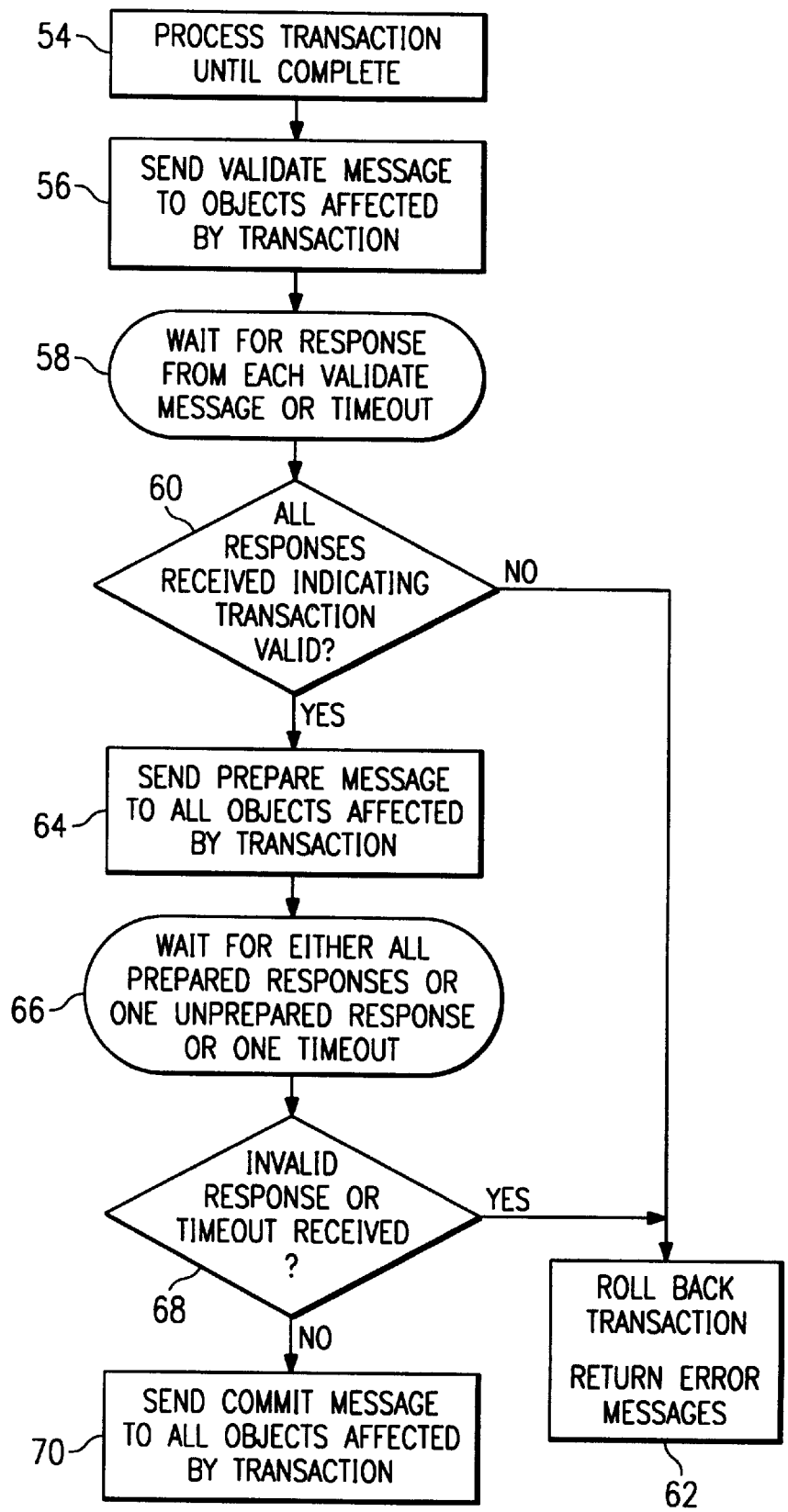
FIG. 3 illustrates a portion of the operation of an exemplary transaction service constructed in accordance with the invention.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed applications and/or distributed system services in accordance with the invention. General purpose computer 22 may be adapted to execute any of the well-known OS2, UNIX, MAC-OS and WINDOWS operating systems or other operating systems. General purpose computer 22 comprises processor 24, random access memory (RAM) 26, read only memory (ROM) 28, mouse 30, keyboard 32 and input/output devices such as disk drives 34, printer 36, display 38 and communications link 40. The present invention includes programs that may be stored in RAM 26, ROM 28 or disk drives 34 and may be executed by processor 24. Communications link 40 connects to a computer network but could be connected to a telephone line, an antenna, a gateway or any other type of communications link. Disk drives 34 may include a variety of types of storage media, such as, for example, floppy disk drives, hard disk drives, CD ROM drives or magnetic tape drives. Although this embodiment employs a plurality of disk drives 34, a single disk drive 34 could be used without departing from the scope of the invention. FIG. 1 only provides one example of a computer that may be used with the invention. The invention could be used on computers other than general purpose computers, as well as on general purpose computers without conventional operating systems.

FIG. 2 illustrates an exemplary distributed object system constructed in accordance with the invention. Although the invention may be used in any system employing shared objects, it is particularly useful in distributed object systems. Distributed object system 42 comprises a plurality of computers 22 networked together. More or less computers could be included without departing from the scope of the invention. Data for distributed objects may, for example, be maintained in one or more databases contained in storage media controlled by one or more of the computers 22.

A process accessing distributed objects does so using a transaction service. In this embodiment, process 46 uses transaction service 44 to access three distributed objects: object 48, object 50, and object 52. Transaction service 44 may perform many functions in addition to the integrity maintenance functions of the invention. Also, the transaction service 44 may be a part of process 46. The term transaction service 44 is meant to refer broadly to computer software that performs the validate-prepare-commit protocol of the invention.

The exemplary system illustrated in FIG. 2 will be used to illustrate the operation of transaction service 44 in maintaining the integrity of objects 48, 50 and 52. Multiple transaction services 44 could be used to control access to distributed objects such as objects 48, 50 and 52 without departing from the scope of the invention. In addition, multiple processes, such as process 46 will commonly access distributed objects such as objects 48, 50 and 52.

FIG. 3 illustrates a flowchart describing a portion of the operation of transaction service 44 in accordance with the invention.

In step 54 the transaction is processed until it is complete, meaning that the transaction has reached a point where the protocol described below is to be executed. Then, in step 56 transaction service 44 sends a validate message to the objects 48, 50 and 52 affected by the transaction. In a distributed object system, the term transaction generally refers to an object transaction comprising a unit of work such that all of the work is either made permanent as a group or rolled back together.

In an alternative embodiment, in step 56 transaction service 44 would send a validate message only to those objects that had registered for validation with transaction service 44. In such an alternative embodiment, each distributed object requiring validation could be made operable to register for validation with the transaction service 44. Alternatively, transaction service 44 could poll distributed objects involved in a transaction to determine whether those objects will require validation at the conclusion of the transaction.

In response to the validation messages received from transaction service 44, objects 48, 50 and 52 each perform validation methods to determine whether the changes caused by the transaction are valid or not. In performing the validation function, objects 48, 50 and 52 may access other distributed objects and/or databases to make the validation determination. Changes preferably should not be made to the data of a distributed object during the validation process because such a change may cause another change that affects the integrity of the system. For example, changing a price of an item on a invoice could affect the total price for the goods reflected on the invoice.

Transaction service 44 keeps track of all operations and all objects and databases that have been affected by a particular transaction. Thus, transaction service 44 knows which objects require validation at the end of the transaction. Validation is preferably done before database updates because all potential problems should be identified before databases are updated. Undoing updates to databases may result in costly consumption of computing resources.

In step 58, transaction service 44 waits for either a response or a timeout for each validate message that was sent. In an alternative embodiment, transaction service 44 could proceed after receiving a single invalid response from any one of the objects to which a validate message was sent. By waiting to receive a response to all validate messages, however, transaction service 44 may identify all potential problems with a given transaction, thus facilitating easier identification and solution of problems with a transaction.

Next, in step 60, it is determined whether all responses received indicated that all distributed objects were valid. If not, then the transaction is rolled back in step 62 and error messages are returned. Conventional methods for transaction roll back may be used. If a valid response was received to each validate message sent by transaction service 44, then in step 64 a prepare message is sent to all objects affected by the transaction. Then, transaction service 44 waits to receive either a prepared response to each of the prepare messages or one unprepared response or one timeout in response to the prepare messages. If even one unprepared response or timeout is received, then transaction service 44 need not wait to receive a response to any additional prepare messages. In step 68 it is determined whether an unprepared response or timeout was received. If so, then transaction service 44 proceeds to step 62. If not, and prepared responses have been received to all of the prepare messages then in step 70 transaction service 44 sends a commit message to all objects affected by the transaction so that the changes may be made permanent.

The invention may be modified to take into account the update of databases used by a distributed object system as well. Accordingly, additional steps may be interwoven within the steps described above without departing from the scope of the invention.

Although the present invention has been described in detail, it should be understood that various changes, substitutions, and alterations can be made hereto without departing from the spirit and scope of the invention as defined by the appended claims.

What is claimed is:

1. A system for maintaining the integrity of objects, comprising:
 a plurality of objects each comprising methods and instance variables, wherein a first number of the plurality of objects will experience a change in at least one of its instance variables in response to a transaction if the transaction is allowed to commit;

a transaction service running on at least one computer and operable to maintain the integrity of the plurality of objects in response to the transaction, the transaction service further operable to send a validate message to ones of the first number of objects, send a prepare message to each of the first number of objects if a valid indicator was received in response to each validate message, and send a commit message to each of the first number of objects if a valid indicator was received in response to each of the validate messages and a prepared indicator was received in response to each of the prepare messages.

2. The system of claim 1, wherein a validate message is sent to each of the first number of objects.

3. The system of claim 1, wherein ones of the plurality of objects are operable to register for validation with the transaction service and wherein a validate message is sent to only those objects that register for validation with the transaction service.

4. The system of claim 1, wherein the transaction service is further operable to roll back the transaction if any of the ones of the first number of objects to which a validate message was sent fails to return a valid indicator in response to the validate message sent to that object.

5. The system of claim 1, wherein the transaction service is further operable to roll back the transaction if any of the first number of objects fails to return a prepared indicator in response to the prepare message sent to that object.

6. The system of claim 4, wherein the transaction service is further operable to roll back the transaction if any of the first number of objects fails to return a prepared indicator in response to the prepare message sent to that object.

7. The system of claim 1, wherein at least one object to which a validate message was sent is operable to execute a validate method in response to the validate message, the validate method applying one or more rules to determine whether the change in the at least one object's instance variables that will be caused by the transaction if the transaction commits is a valid change.

8. The system of claim 4, wherein the transaction service does not begin to roll back the transaction, where at least one of the first number of objects to which a validate message was sent failed to return a valid indicator, until a response has been received or a timeout condition has occurred in response to each validate message.

9. The system of claim 5, wherein the transaction service immediately begins to roll back the transaction if an unprepared indicator is received or a timeout condition occurs in response to any prepare message.

10. The system of claim 6, wherein the transaction service does not begin to roll back the transaction, where at least one of the first number of objects to which a validate message was sent failed to return a valid indicator, until a response has been received or a timeout condition has occurred in response to each validate message, and wherein the transaction service immediately begins to roll back the transaction if an unprepared indicator is received or a timeout condition occurs in response to any prepare message.

11. A method for maintaining the integrity of a plurality of objects each comprising methods and instance variables, wherein each of the plurality of objects will experience a change in at least one of its instance variables in response to a transaction if the transaction is allowed to commit, the method comprising:

sending a validate message to ones of the plurality of objects using a transaction service running on a computer;

sending a prepare message to each of the plurality of objects if a valid indicator was received in response to each validate message, and sending a commit message to each of the plurality of objects if a valid indicator was received in response to each of the validate messages and a prepared indicator was received in response to each of the prepare messages.

12. The method of claim 11, wherein sending a validate message further comprises sending a validate message to each of the plurality of objects.

13. The method of claim 11, wherein ones of the plurality of objects are operable to register for validation with the transaction service and wherein a validate message is sent to only those objects that register for validation with the transaction service.

14. The method of claim 11, further comprising:

rolling back the transaction if any of the ones of the plurality of objects to which a validate message was sent fails to return a valid indicator in response to the validate message sent to that object.

15. The method of claim 11, further comprising:

rolling back the transaction if any of the plurality of objects fails to return a prepared indicator in response to the prepare message sent to that object.

16. The method of claim 11, further comprising:

executing a validate method on at least one object to which a validate message was sent in response to the validate message, the validate method applying one or more rules to determine whether the change in the at least one object's instance variables that will be caused by the transaction if the transaction commits is a valid change.

17. The method of claim 14, further comprising:

rolling back the transaction if any of the plurality of objects fails to return a prepared indicator in response to the prepare message sent to that object, wherein the rolling back of the transaction, where at least one of the plurality of objects to which a validate message was sent failed to return a valid indicator, does not begin until a response has been received or a timeout condition has occurred in response to each validate message, and wherein the rolling back of the transaction, where at least one of the plurality of objects fails to return a prepared indicator, begins immediately if an unprepared indicator is received or a timeout condition occurs in response to any prepare message.

18. A system for maintaining the integrity of a plurality of objects each comprising methods and instance variables, wherein each of the plurality of objects will experience a change in at least one of its instance variables in response to a transaction if the transaction is allowed to commit, the system comprising:

a computer-readable storage medium; and a transaction service residing on the computer-readable storage medium and operable to maintain the integrity of the plurality of objects in response to the transaction, the transaction service further operable to send a validate message to ones of the plurality of objects, send a prepare message to each of the plurality of objects if a valid indicator was received in response to each validate message, and send a commit message to each of the plurality of objects if a valid indicator was received in response to each of the validate messages and a prepared indicator was received in response to each of the prepare messages.

19. The system of claim 18, wherein the transaction service is further operable to roll back the transaction if any of the ones of the plurality of objects to which a validate message was sent fails to return a valid indicator in response to the validate message sent to that object.

20. The system of claim 18, wherein the transaction service is further operable to roll back the transaction if any of the plurality of objects fails to return a prepared indicator in response to the prepare message sent to that object.

* * * * *